Aug. 5, 1952 V. R. LEARNED 2,606,302
TEMPERATURE COMPENSATED CAVITY RESONATOR STRUCTURE
Filed March 30, 1949 2 SHEETS—SHEET 2
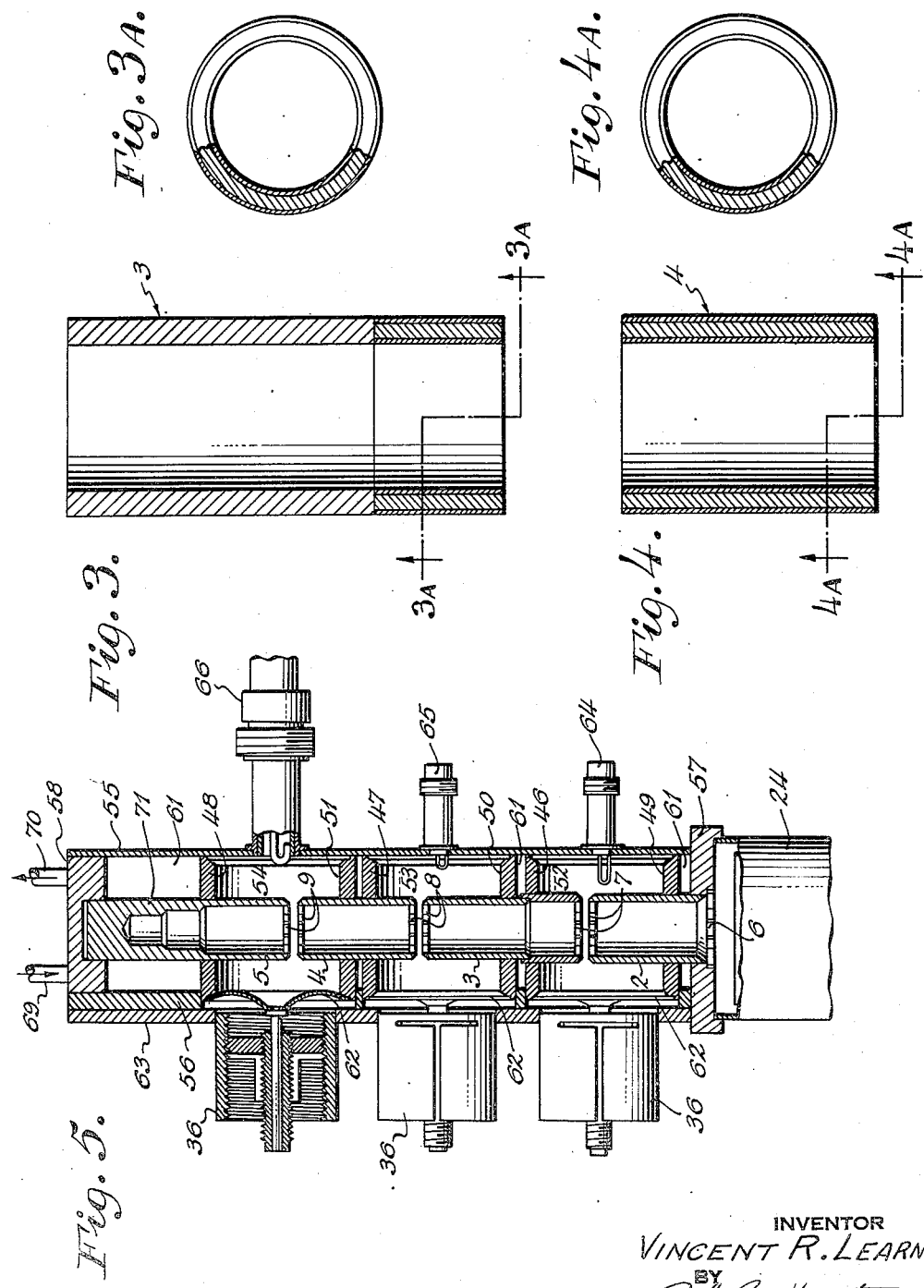
INVENTOR
VINCENT R. LEARNED
BY
Paul B. Hunter
ATTORNEY Patented Aug. 5, 1952

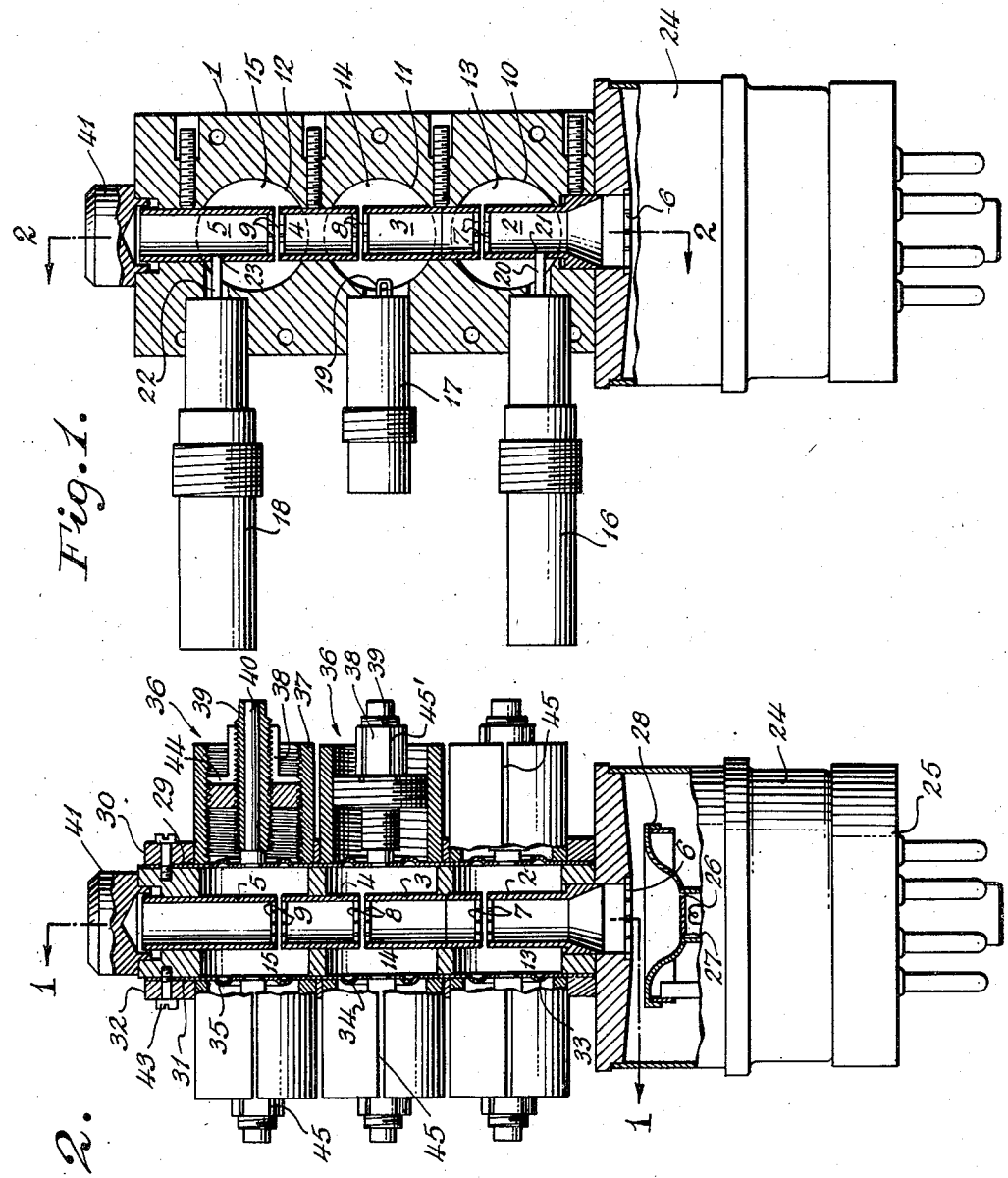

2,606,302

UNITED STATES PATENT OFFICE 2,606,302

TEMPERATURE COMPENSATED CAVITY RESONATOR STRUCTURE

Vincent R. Learned, Garden City, N. Y., assignor to The Sperry Corporation, Great Neck, N. Y., a corporation of Delaware Application March 30, 1949, Serial No. 84,430

12 Claims. (Cl. 315—6)

The present invention relates to frequency-stabilized cavity resonator structure and, in particular, to an improved method of temperature compensating a cavity resonator, or a plurality thereof, to oppose and overcome the effects of variations of ambient temperature.

For most purposes, it is highly desirable and sometimes practically necessary that the operation of the cavity resonator be unaffected, or negligibly affected, by ambient temperature variations over wide ranges. To accomplish such stabilized operation, the cavity resonator must be temperature compensated. Due to variations of ambient temperature, the cavity resonator undergoes expansions or contractions depending upon whether the temperature rises or falls, causing the natural frequency of the cavity resonator to alter undesirably. For example, an increase of ambient temperature causes an increase in the volumetric dimensions of the cavity resonator. The grid gap spacing of the electron discharge type of reentrant cavity resonator also increases, but not enough to maintain resonant frequency at the desired value. The increase of the grid gap spacing and volumetric dimensions of the cavity resonator electrically oppose each other, the former tending to increase frequency and the latter tending to decrease frequency; however, the net result is a shift of the natural frequency of the cavity resonator to a lower value because the latter predominates.

Recognition of this problem has resulted in prior art automatic frequency stabilization arrangements for the electron discharge type of cavity resonator. Some have proven successful and operable but expensive, because they involve relatively complicated structures that must be added to an already complicated tube structure. An example of such an arrangement includes an extensive system of resiliently biased, thermally sensitive struts, springs or wires arranged to act upon a flexible wall of the cavity resonator; the flexible wall in turn is linked to the reentrant portion of the cavity resonator. The thermally sensitive struts, springs, or wires are adapted to expand or contract in accordance with ambient temperature variations; this motion is transmitted to the reentrant portion of the cavity resonator through the flexible wall to temperature compensate the cavity resonator.

Experiment has shown that such prior art arrangements exhibit undesirable hysteresis phenomenon. This hysteresis phenomenon reduces the accuracy of the prior art automatic frequency stabilization arrangements, because it precludes similar amounts of compensation for identical cycles of ambient temperature variations.

The present invention establishes a much simpler method of solving this problem. It eliminates entirely the auxiliary thermally sensitive bodies of the prior art arrangements, such as the struts, wires, springs and the flexible wall. As a consequence, the hysteresis phenomenon is completely minimized.

The present invention contemplates using the reentrant portion of the cavity resonator as the thermally sensitive compensating element. The reentrant portion of the cavity resonator, which defines the passage for the beam of electrons, is chosen of material, or a combination of materials, of a proper net expansivity. The proper amount of grid spacing expansion or contraction is therefore obtainable to oppose and overcome frequency drifts caused by variations of ambient temperature.

When the reentrant portion of the cavity resonator is made of the proper material, or combination of materials, improved results are obtainable without any sacrifice of the electrical advantages present in the prior art compensating arrangements. For example, for "push to talk" operation, instantaneous stable operation of the electron discharge tube is desirable; hence, the unstable built-up period must be as short as possible. This requires a cavity resonator that has satisfactory warm-up characteristics.

Pursuant to the present invention, it was found that a copper-plated Kovar reentrant post provides improved warm-up characteristics. Kovar is an alloy composed essentially of an iron base, nickel, cobalt and small amounts of manganese and carbon. It has a thermal coefficient of expansion of the order of $4.7 \times 10^{-6}$ inches per inch per degree centigrade. In a particular instance, a reentrant post of copper-plated Kovar exhibits the expansion characteristic to satisfactorily regulate the grid spacing for successful temperature compensation, and it also exhibits the heat conducting properties of copper to satisfactorily conduct heat from the reentrant portion of the cavity resonator to provide desirable warm-up characteristics. The copper-plated Kovar reentrant post also provides satisfactory electrical conducting properties for microwave frequency cavity resonators.

It is therefore the main object of this invention to provide a novel arrangement that opposes and overcomes undesired variations or drift in the resonant frequency of a cavity resonator arising from variations of ambient temperature.

It is therefore an important object to provide an electron discharge type of cavity resonator with a novel arrangement opposing and compensating for frequency drifts arising from sudden or gradual variations of ambient temperature over narrow or wide ranges.

A further object is to provide a novel automatic thermal-compensating and frequency-stabilization arrangement for an electron discharge type of cavity resonator.

A further object is to provide an automatic thermal-compensating arrangement for a novel electron discharge type of cavity resonator structure.

A further object is to provide, in an electron discharge type cavity resonator wherein the cavity volume and grid spacing, and consequently the resonant frequency, change in accordance with variations of ambient temperature, a novel temperature-compensating arrangement that opposes and overcomes the frequency changes resulting from such temperature changes. Pursuant to this object, the reentrant portion of the cavity resonator is made of a satisfactory conducting material of a lower net expansivity than the net expansivity of the material constituting the walls and body of the cavity resonator structure.

A further object is to provide for an electron discharge type of cavity resonator, a bimetallic reentrant portion that has a lower net thermal expansivity than the net thermal expansivity of the body and surface portions of the cavity resonator.

A further object is to provide, in an electron discharge type of cavity resonator, a novel temperature-compensating arrangement giving rise to improved warm-up characteristics in the cavity resonator.

Further objects and advantages of the present invention will become apparent from the following specification and drawings in which, Fig. 1 is a longitudinal view partly in section taken along line 1—1 of Fig. 2 illustrating an approved embodiment of the invention;

Fig. 2 is a longitudinal view partly in section taken along line 2—2 of Fig. 1;

Fig. 3 is a longitudinal view partly in section of a reentrant post;

Fig. 3A is a view taken along line 3A—3A of Fig. 3;

Fig. 4 is a longitudinal view partly in section of another reentrant post;

Fig. 4A is a view taken along line 4A—4A of Fig. 4; and

Fig. 5 is a longitudinal view partly in section of a modified embodiment.

Similar characters of reference are used to indicate corresponding parts.

The invention is peculiarly adapted to the type of cavity resonator structure employed in the novel electron discharge tubes disclosed and claimed in the copending application Serial No. 83,730, filed March 26, 1949, in the name of Sigurd F. Varian. A detailed description of an approved embodiment of the invention, as applied to such an electron discharge device, now follows.

Referring to Figs. 1 to 4, body 1 of the cavity resonator structure is a block of conducting material, in this instance, it is made of oxygen-free copper. Body 1 has three diametrally aligned cylindrical inner surfaces 10, 11 and 12 forming the cylindrical inner surfaces of the three vacuum-tight drum-shaped cavity resonators 13, 14 and 15. A series of linearly aligned tubular-shaped conducting bodies 2, 3, 4 and 5 form a passage for the beam of electrons. These bodies taken in pairs, 2 and 3, 3 and 4, and 4 and 5, extend into the cavity chambers toward each other from opposite regions of the cylindrical inner surfaces 10, 11 and 12, respectively, to define the reentrant portions of the cavity resonators 13, 14 and 15. Electron permeable grids 7, 8 and 9 are located at the adjacent ends of the tubular bodies 2, 3, 4 and 5 to define a radio frequency voltage grid gap for each cavity resonator. Accelerator grid 6 is located at the end of body 2 nearer the cathode assembly 24, presently to be described.

The cavity resonators 13, 14 and 15 are coupled to external apparatus, not shown, by antenna assemblies 16, 17 and 18. The middle antenna assembly 17 is terminated with a loop 19, and the inner conductors 20, 22 of the antenna assemblies 16, 18 project into cavity resonators 13, 15 respectively, as probes. The inner conductors 20, 22 terminate at 21, 23 on the outer cylindrical walls of the tubular bodies 2, 5, respectively. The inner conductors 20, 22 are off-set with respect to the longitudinal axes of the cavity resonator chambers, that is, they extend along a chord therein. The amount of off-setting regulates the amount of coupling between the antenna assemblies 16, 18 and cavity resonators 13, 15.

Cathode assembly 24 is sealed vacuum-tight to body 1, and it includes a multi-pronged base 25, cathode button 26, heater 27 and a focusing shield 28. A collector cap 41 is secured vacuum-tight at the end of the passage for the beam of electrons opposite the cathode assembly 24.

Diaphragm stampings 29, 31, preferably of copper and secured vacuum-tight to body 1, define the end walls for the cavity resonator structure. These stampings have annular undulations 33, 34 and 35 providing flexible regions that serve as tuning diaphragms for the cavity resonators 13, 14 and 15. Outer face stampings 30, 32 are removably mounted by tap bolts 43 over diaphragm stampings 29, 31, respectively, and they carry differential screw tuning assemblies 36 that are manually operated to flex the diaphragms to tune the cavity resonators to desired frequencies of operation. Threaded outer jacket 37, threaded nut 38, threaded sleeve 39 and rod 40, which is connected at its inner end to a diaphragm, form a differential screw assembly. An embossed screw driver, not shown, engages the radial slots 44 on nut 38 to activate the tuning assembly 36. The slots 45, 45' on outer jacket 37 and nut 38 serve to load the threads of the differential tuning assembly to prevent backlash.

In the operation of the electron discharge tube, the beam of electrons leaves the cathode button 26, and it traverses the passage provided therefor to terminate subsequently on the collector cap 41. A direct current potential, not shown, applied to the accelerator grid 6 accelerates the electrons to a high velocity. At the first interaction gap in the input cavity resonator 13, the velocity of the individual electrons is varied in accordance with the phase and magnitude of the "input" radio frequency voltage supported between the grids 7. The "input" signal at this gap is supplied by external apparatus not shown. The density modulated or bunched beam of electrons continues for further interaction at the radio frequency voltage grid gap defined by grids 8 in the middle resonator. The beam of electrons then continues to the output cavity resonator, and interaction at the radio frequency voltage grid gap defined by grids 9 energizes the output cavity resonator 15, which may be coupled to a load not shown.

The natural frequency of the cavity resonator depends upon its physical dimensions. Variations of ambient temperature give rise to variations of these dimensions. This causes the frequency of the cavity resonator to shift. For example, an increase of ambient temperature causes the overall dimension of the cavity resonator structure to increase in accordance with the net thermal expansivity of the components defining the cavity resonator structure. Both the radio frequency voltage gap and the overall volumetric dimensions of the resonator chamber of an electron discharge type of cavity resonator increase. However, the effect of the latter generally predominates. The overall effect then is a decrease in the frequency of oscillation. It will be understood that frequency varies inversely with changes in the volumetric dimensions of the cavity resonator and directly with respect to changes of the grid gap spacing.

It is therefore desirable to oppose and compensate for the shift or change in frequency by increasing the rate of the grid spacing change due to variations in ambient temperature. In terms of lumped-constant equivalent circuits, the capacitance defined by the grid gap would then be changed a sufficient amount to effect an increase or decrease of frequency which would offset the frequency shifts caused by the thermal variations of the overall dimensions of the cavity resonator. Pursuant to the present invention, the reentrant portions of the cavity resonators 13, 14 and 15 are made of a combination of materials having a linear thermal expansivity that affords the proper rate of change of grid gap spacings.

For a cavity resonator structure made of copper, each cavity resonator has a copper reentrant body and a bimetallic copper-Kovar reentrant body. For the cavity resonator 13, tubular body 2 is made of copper, and the portion of tubular body 3 extending into the chamber of cavity resonator 13 is made of copper-plated Kovar. A blown-up view of tubular body 3, Figs. 3, 3A, shows that the portion thereof associated with cavity resonator 13 comprises a hollow Kovar core having the inner and outer surfaces thereof plated with copper. The remainder of tubular body 3, which extends into cavity resonator 14, is made of copper. Tubular body 4 is made of copper-plated Kovar, Figs. 4, 4A, and the opposite ends thereof extend, respectively, into cavity resonators 14 and 15. Tubular body 5 is the copper reentrant body for the cavity resonator 15.

It will be understood that the invention is not limited to the combination of copper-plated Kovar and copper reentrant portions for cavity resonators. Any material or combination of materials defining a net expansivity that regulates the rate of change of the grid gap spacings to offset the effects of the rate of change of the overall physical dimensions of the cavity resonators, as by an increase of ambient temperature, will suffice. For example, it was also discovered that tubular bodies of molybdenum successfully perform the desired function for cavity resonator structure made of copper or steel. However, for manufacturing purposes the preferred embodiment consists of copper-plated Kovar and copper tubular bodies functioning as the reentrant portion of a cavity resonator.

The net expansivity of the reentrant portion of the cavity resonator and accordingly the amount of temperature compensation afforded may be regulated by extending the tubular bodies unequal lengths into the cavity resonator chamber. This produces a grid gap that is off-set with respect to the longitudinal axis of the drum-shaped cavity resonator.

For a particular example, a drum-shaped cavity resonator designed to operate at 5,000 mc. has an inner surface of a diameter .531", and the reentrant portion thereof has inner and outer diameters of .250" and .280", respectively. In this instance a 1:2 ratio of copper plating to Kovar for the bimetallic tubular body exhibits the expansivity characteristics of Kovar to satisfactorily regulate the grid gap spacing for successful temperature compensation. This ratio also exhibits proper heat conducting properties for the tubular body to provide for desirable warm-up characteristics. Furthermore, the copper-plated surface serves as a satisfactory microwave frequency conductor for the current flow in the cavity resonator. The outer and inner layers of copper plating are each .005" thick, and the Kovar core of the tubular body is .020" thick. The amount of off-set for the grid gap spacing is approximately .120" measured from the center of the grid gap spacing to the longitudinal axis of the drum-shaped cavity resonator.

Fig. 5 shows the application of the present invention to the hollow type of cavity resonator structure, also disclosed and claimed in the aforesaid application of Sigurd F. Varian. Copper tubular bodies 46, 47 and 48 have cylindrical inner surfaces 49, 50 and 51 defining the cylindrical inner surfaces of the drum-shaped vacuum-tight cavity resonators 52, 53 and 54. The series of aligned tubular bodies 2, 3, 4 and 5 form a passage for a beam of electrons, and they also define in each cavity resonator 52, 53 and 54 a radio frequency voltage gap. The assembled tubular bodies with the inner surfaces 49, 50 and 51 in diametral alignment, are surrounded by copper face stampings 55, 56, 57, 58, and two face stampings in the plane of the paper not shown in the figure. A hollow interior 61 is defined by the inner surfaces of the face stampings and the outer surfaces of the assembled tubular bodies.

Copper diaphragms 62 and face stampings 55 define the end walls of the drum-shaped cavity resonators 52, 53 and 54. Differential screw tuning assemblies 36 mounted on removably secured outer face stamping 63 permit manual activation of the diaphragms to tune the cavity resonators to desired frequencies of operation. Coupling members 64, 65 and 66 mounted on face stamping 55 couple the cavity resonators to external apparatus not shown. Accelerator grid 6 is mounted at the end of tubular body 2 nearer the cathode assembly 24. Other grids 7, 8 and 9 are located at the adjacent ends of tubular bodies 2, 3, 4 and 5.

Tubular body 5 is closed at 71 which serves thereat as an electron absorbing surface. Conduit 69 mounted on face stamping 58 may be used to direct a cooling fluid into the hollow interior 61 for the purpose of cooling the cavity resonators during their operation. The fluid leaves hollow interior 61 at 70.

For temperature compensation purposes, tubular body 2 is made of copper. The portion of tubular body 3 extending into cavity resonator 52 is copper-plated Kovar. Tubular body 4 is the copper-plated Kovar element for the cavity resonators 53 and 54. The portion of tubular body 3 extending into cavity resonator 53 is made of copper, and tubular body 5 is also made of copper.

It will be understood that the operation of the electron discharge device of Fig. 5 is similar to the device shown in Figs. 1 and 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A temperature-compensated drum-shaped microwave frequency cavity resonator comprising conducting means having a cylindrical inner surface and end walls of a first net expansivity defining the chamber of said resonator, and a pair of conductive reentrant posts extending radially into said chamber from opposite regions of the cylindrical inner surface thereof to define a capacity section therebetween, said reentrant posts being parallel to and situated substantially midway between said end walls, at least one of said reentrant posts having the expansivity properties of Kovar to define a lower net expansivity for said reentrant portion than said first expansivity, whereby frequency variations due to changes of ambient temperatures are compensated.

2. A temperature-compensated drum-shaped microwave frequency cavity resonator as defined in claim 1, wherein the posts extend unequal distances into the cavity chamber to regulate the net expansivity of the reentrant portion of said cavity chamber, the capacity section between said reentrant posts being eccentrically displaced from the axis of said cylindrical inner surface of said resonator.

3. A temperature-compensated microwave frequency cavity resonator comprising conducting means of a first net expansivity having a cylindrical inner surface and end walls defining the cavity of said resonator, a first reentrant post having a hollow core of Kovar and inner and outer surfaces of copper, a second reentrant post of copper, said posts extending toward each other from opposite regions of said cylindrical surface of said chamber to define a capacity loading section therein, and said posts being extended unequal distances into said chamber to determine the amount of temperature compensation.

4. A temperature-compensated microwave frequency cavity resonator comprising conducting means of a first net expansivity having a plurality of cylindrical inner surfaces and end walls forming cavity resonator chambers, said cylindrical inner surfaces being in diametral alignment, and a series of aligned reentrant posts defining a capacity section reentrant portion in each of said chambers, each of said chambers having therein a pair of said posts, each post of said pairs being directed toward each other from the opposite regions of said cylindrical inner surface, one of said posts of each of said pairs being of low expansivity material to afford a lower net expansivity for its correlated reentrant portion than said first net expansivity for preventing frequency variations due to changes of ambient temperature.

5. A temperature-compensated microwave frequency cavity resonator as defined in claim 4, wherein the posts of low expansivity comprise copper-plated Kovar, and the remainder of the conducting means and posts forming the cavity resonator comprise copper.

6. An electron discharge tube incorporating a plurality of temperature-compensated cavity resonators, comprising a block of conducting material having diametrally aligned inner surfaces and conducting end walls of a first net expansivity defining the cavity resonator chambers, a series of aligned reentrant posts forming a passage for a beam of electrons, and means adjacent said series for emitting said beam of electrons through said passage, each of said chambers having two posts of said series of posts extending therein toward each other from opposite regions of the cylindrical inner surface thereof defining a voltage gap in each of said chambers, one of said posts extending into each of said chambers having a hollow core of Kovar and the inner and outer surface thereof of copper to afford a lower net expansivity for the reentrant portion of each of said cavity resonators than said first net expansivity, whereby frequency variations due to changes of ambient temperature are compensated.

7. An electron discharge tube as defined in claim 6, wherein the posts of each cavity chamber extend therein unequal distances to regulate the amount of temperature compensation thereof.

8. An electron discharge tube incorporating a plurality of temperature-compensated drum-shaped cavity resonators, comprising assembled conducting tubular bodies and end walls of a first net expansivity, certain of said tubular bodies having the inner surfaces thereof in diametral alignment and defining the tubular inner surfaces of the cavity chambers, the remainder of said tubular bodies being in linear alignment to form a passage for a beam of electrons, and means adjacent said passage for emitting said beam of electrons through said passage, each of said chambers having two of said linearly aligned bodies extending therein toward each other from opposite regions of the cylindrical inner surface thereof defining a voltage gap in each of said chambers, one of said linearly aligned bodies in each of said chambers having a hollow core of Kovar with inner and outer surfaces of copper to afford a lower net expansivity than said first expansivity, whereby frequency variations due to changes of ambient temperature are compensated.

9. An electron discharge tube as defined in claim 8, wherein the linearly aligned bodies of each of said cavity chambers extend therein unequal distances to regulate the amount of temperature compensation thereof.

10. A temperature-compensated drum-shaped microwave frequency cavity resonator comprising conducting means having a cylindrical inner surface and end walls of a first net expansivity defining the chamber of said resonator, and a reentrant portion for said cavity resonator including at least one conducting member extending into said chamber along a chord of said cylindrical inner surface, said reentrant portion having a lower net expansivity than said first net expansivity.

11. A temperature-compensated drum-shaped microwave frequency cavity resonator comprising conducting means having a cylindrical inner surface and end walls of a first net expansivity defining the chamber of said resonator and a reentrant portion for said cavity resonator including a pair of reentrant posts extending radially into said chamber from opposite regions of the cylindrical inner surface thereof along an axis transverse the axis of said cylindrical inner surface, one of said reentrant posts having a lower net expansivity than said first net expansivity.

12. The apparatus as defined in claim 11, wherein said reentrant posts are hollow, said apparatus further including evacuated electron discharge means comprising a cathode and focussing electrodes for directing a stream of electrons through said reentrant posts for interaction with the microwave energy field in said cavity resonator.

VINCENT R. LEARNED.

REFERENCES CITED

The following references are of record in the file of this patent:

UNITED STATES PATENTS

| Number | Name | Date |
|---|---|---|
| 2,183,215 | Dow | Dec. 12, 1939 |
| 2,374,810 | Fremlin | May 1, 1945 |
| 2,413,364 | McCarthy | Dec. 31, 1946 |
| 2,418,844 | Le Van | Apr. 15, 1947 |
| 2,452,062 | Le Van | Oct. 26, 1948 |
| 2,468,141 | True | Apr. 26, 1949 |

FOREIGN PATENTS

| Number | Country | Date |
|---|---|---|
| 422,869 | Great Britain | Jan. 21, 1935 |